(12) United States Patent
Lammers

(10) Patent No.: US 11,075,506 B2
(45) Date of Patent: Jul. 27, 2021

(54) MAINTENANCE LATCH FOR SWITCHGEAR SHUTTER

(71) Applicant: Eaton Intelligent Power Limited, Dublin (IE)

(72) Inventor: Willem Lammers, Delden (NL)

(73) Assignee: EATON INTELLIGENT POWER LIMITED, Dublin (IE)

(*) Notice: Subject to any disclaimer, the term of this patent is extended or adjusted under 35 U.S.C. 154(b) by 0 days.

(21) Appl. No.: 16/966,490

(22) PCT Filed: Jan. 21, 2019

(86) PCT No.: PCT/EP2019/051401
§ 371 (c)(1),
(2) Date: Jul. 31, 2020

(87) PCT Pub. No.: WO2019/149560
PCT Pub. Date: Aug. 8, 2019

(65) Prior Publication Data
US 2021/0044092 A1    Feb. 11, 2021

(30) Foreign Application Priority Data

Feb. 1, 2018 (GB) ..................................... 1801656

(51) Int. Cl.
*H02B 11/24* (2006.01)
(52) U.S. Cl.
CPC .................................... *H02B 11/24* (2013.01)
(58) Field of Classification Search
CPC .................................. H02B 1/14; H02B 11/24
See application file for complete search history.

(56) References Cited

U.S. PATENT DOCUMENTS

| 9,685,282 B2 * | 6/2017 | Mun | H02B 11/133 |
| 2013/0222979 A1 * | 8/2013 | Salugu | H02B 11/24 |
| | | | 361/637 |
| 2018/0241183 A1 * | 8/2018 | Gasparini | H02B 11/24 |

FOREIGN PATENT DOCUMENTS

| EP | 0577111 A2 * | 1/1994 | H02B 11/24 |
| EP | 3016223 A1 | 5/2016 | |
| JP | 53116444 A * | 10/1978 | |
| JP | 56136413 U * | 10/1981 | |
| JP | S6074909 A | 4/1985 | |
| JP | H0150162 B2 * | 10/1989 | |
| JP | H11150819 A * | 2/1999 | H02B 11/24 |

(Continued)

*Primary Examiner* — Robert J Hoffberg
(74) *Attorney, Agent, or Firm* — Leydig, Voit & Mayer, Ltd.

(57) ABSTRACT

A switchgear housing for housing an object, such as a circuit breaker, includes: a wall with an access opening for access to a high voltage connector; at least one shutter plate movable parallel to the wall between a closed position, in which the shutter plate covers the opening and an open position, in which the shutter plate exposes the opening; an urging means for urging the at least one shutter plate towards the closed position; an operating mechanism for operating the shutter plate from the closed position to the open position when an object is moved into the housing; and at least one latch movable in a direction perpendicular to the wall with the access opening and between a latched position and an unlatched position. A path of the at least one latch and a path of the shutter plate intersect.

10 Claims, 3 Drawing Sheets

(56) References Cited

FOREIGN PATENT DOCUMENTS

| | | | | |
|---|---|---|---|---|
| JP | H11164424 A | * | 6/1999 | ............. H02B 11/24 |
| JP | 2011223779 A | * | 11/2011 | |
| JP | 2011223779 A | | 11/2011 | |
| WO | WO 2017045838 A1 | | 3/2017 | |

* cited by examiner

MAINTENANCE LATCH FOR SWITCHGEAR SHUTTER

CROSS-REFERENCE TO PRIOR APPLICATIONS

This application is a U.S. National Phase application under 35 U.S.C. § 371 of International Application No. PCT/EP2019/051401, filed on Jan. 21, 2019, and claims benefit to British Patent Application No. GB 1801656.8, filed on Feb. 1, 2018. The International Application was published in English on Aug. 8, 2019 as WO 2019/149560 under PCT Article 21(2).

FIELD

The invention relates to a switchgear housing for housing an object, such as a circuit breaker, the switchgear housing comprising: a wall with an access opening for access to for example a high voltage connector; at least one shutter plate movable parallel to the wall between a closed position, wherein the shutter plate covers the opening and an open position, wherein the shutter plate exposes the opening; urging means for urging the at least one shutter plate towards the closed position; an operating mechanism for operating the shutter plate from the closed position to the open position when an object such as a circuit breaker is moved into the housing.

BACKGROUND

Such a switchgear housing is for example known from WO 2017045838, which shows a switchgear housing with shutter plates operated by an operating mechanism. When a withdrawable circuit breaker is racked into the switchgear housing, the operating mechanism is actuated, such that it will operate the shutter plates from the closed position to the open position, and such that the circuit breaker can connect to a high voltage connector positioned behind the access openings arranged in the wall.

When the circuit breaker is withdrawn from the switchgear housing, the operating mechanism allows the shutter plates to move to the closed position covering the access opening and accordingly covering the high voltage connectors.

So, when the circuit breaker is fully removed from the switchgear housing, the high voltage connectors are safely covered by the shutter plates, such that no danger will exist for maintenance personnel when the switchgear housing is empty and open.

Also EP 3016223 discloses a switchgear housing with shutter plates to cover an access opening in a wall. In this publication two shutter plates are provided, one moving up and the other moving down when opening. A rod system is provided for operating the shutters in reaction to the movement of the withdrawable object, such as a circuit breaker.

In some occasions, it is required during maintenance to access the access openings in the wall, which would typically be covered by the shutter plates. To this end, maintenance personnel would typically move the shutter plate by hand from the closed position to the open position and place some kind of tool to prevent the urging means from reclosing the shutter plate.

When maintenance has been performed, the tool needs to be removed before the switchgear housing can be used again and for example a circuit breaker can be racked in again. If the tool is forgotten the tool could damage the circuit breaker when it is racked in, or the movement of the shutter plates is disabled by the tool, such that upon later removal of the circuit breaker and opening the switchgear housing could lead to substantial risks for maintenance personnel.

SUMMARY

In an embodiment, the present invention provides a switchgear housing for housing an object, such as a circuit breaker, the switchgear housing comprising: a wall with an access opening; at least one shutter plate movable parallel to the wall between a closed position, in which the shutter plate covers the opening and an open position, in which the shutter plate exposes the opening; an urging means configured to urge the at least one shutter plate towards the closed position; an operating mechanism configured to operate the shutter plate from the closed position to the open position when an object is moved into the housing; and at least one latch movable in a direction perpendicular to the wall with the access opening and between a latched position and an unlatched position, wherein a path of the at least one latch and a path of the shutter plate intersect, such that the at least one latch, in the latched position, blocks movement of the shutter plate from the open position to the closed position.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
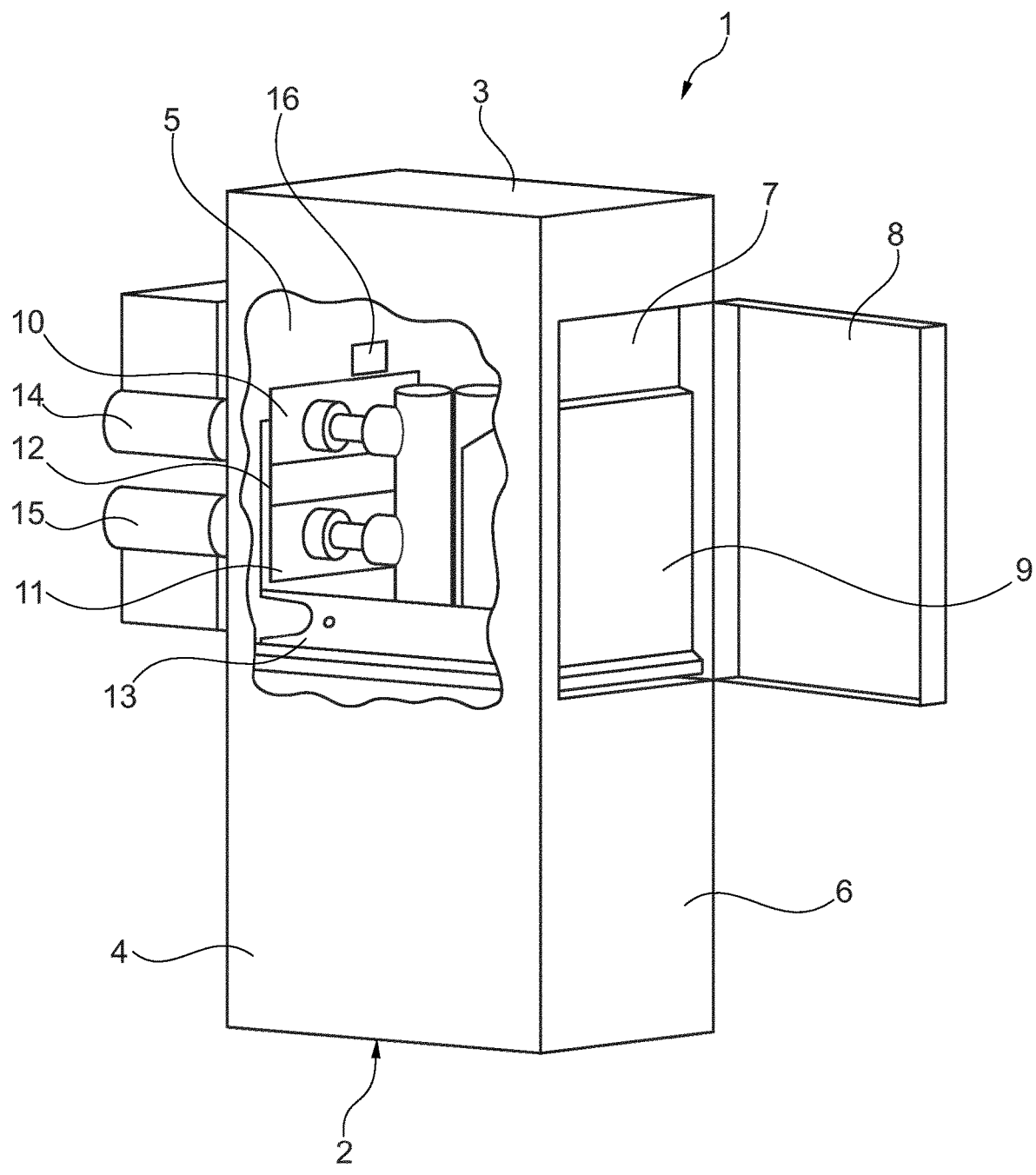
FIG. 1 shows a perspective view with cut away portions of a switchgear housing according to the invention.

In an embodiment, the present invention reduces or even removes the above mentioned disadvantages.

In an embodiment, the present invention provides a switchgear housing, which is characterized by at least one latch movable in a direction perpendicular to the wall with the access opening and between a latched position and an unlatched position, wherein the path of the latch and the path of the shutter plate intersect, such that the latch, in the latched position, blocks movement of the shutter plate from the open position to the closed position.

By having a latch arranged in the switchgear housing, specifically designed for blocking movement of the shutter plate, it is ensured that when an object, such as a circuit breaker, is placed back into the switchgear housing, the object cannot be damaged, when the latch is left in the latched position.

In a preferred embodiment of the switchgear housing according to the invention the at least one latch comprises a hook-shaped element guided along a guide and spring means for urging the hook-shaped element towards the unlatched position.

With this embodiment, the latch can be pulled out along the guide by maintenance personnel to block the movement of the shutter plate. When maintenance has finished, the shutter plate only needs to momentarily be pulled out of engagement of the latch, for the latch to be pulled back to the unlatched position by the spring means.

In an embodiment of the switchgear housing according to the invention the hook-shaped element has a J-shaped cross-section, wherein the top of the J-shaped cross-section is arranged to the guide and wherein the bottom part of the J-shaped cross-section grabs around the shutter plate in latched position.

By having a J=shaped cross-section, the guide can be placed at a distance from the access opening in the wall, while the bottom part can be positioned close to the edge of the access opening, such that latch can easily be mounted and still can keep the shutter plate near the fully open position.

In a preferred embodiment of the switchgear housing according to the invention the hook-shaped element comprises at least one protrusion, extending parallel to and spaced apart from the wall with the access opening both in the latched and unlatched position.

The protrusion, which will be at all times spaced apart from the wall with the access opening, allows for a tool to grip the latch and pull the latch from the unlatched towards the latched position.

In a preferred embodiment of the switchgear housing according to the invention the at least one latch blocks movement of the shutter plate in an intermediate position of the shutter plate between the closed position and the open position, said intermediate position being such that when the shutter plate is moved further toward the open position, the at least one latch is automatically returned to its unlatch position.

When a circuit breaker or the like is racked into the switchgear housing, the operating mechanism will be actuated by the circuit breaker and the shutter plate will be moved to the open position. As a result, the shutter plate will be pulled out of engagement of the latch, which will then be urged back by the spring means to the unlatched position.

As a result an automatic unlatching latch is provided ensuring that after reinserting the object, such as a circuit breaker, into the housing, the shutter plates are fully functional again.

In a further embodiment of the switchgear housing according to the invention the housing comprises a bottom wall, side walls arranged along the sides of the bottom wall and a top wall arranged on top of the side walls, wherein one of the side walls is the wall with the access opening and wherein one side wall is removable, for example door-like, for access of an object being moved into the housing.

Preferably, the wall with the access opening is arranged opposite of the removable wall. This ensures that the wall with the access opening is positioned at the back of the space enclosed by the housing.

In an embodiment of the invention, the latch catches the shutter in an intermediate position between the open and closed position and advantageously slightly before the shutter's open position. The fully open position is the highest point for the upper shutter or lowest point for the bottom shutter. The intermediate position is such that the remaining vertical course of the shutter toward the fully open position is bigger than the length of the contact area between the latch and the shutter along the vertical axis.

Accordingly, when the shutters are latched in such an intermediate position, the shutters can still be moved towards their fully open position in such way that the shutter will become disengaged from the latch. In particular, the insertion of a breaker will cause the shutters to move to their respective fully open positions, since the course of the shutter toward the fully open position is bigger than the contact area between the shutter and the latch, the insertion of the breaker pushes the shutters out of the latches. Because these latches are spring loaded they will retract to their unlatched positions so that they will not further block the normal vertical movement of the shutter. According to this embodiment, there is no tool or manual action needed to make the latches retract beyond the normal operation of inserting the breaker and the latch is considered self-resetting.

FIG. 1 shows a switchgear housing 1. The housing has a bottom 2, a top wall 3 and side walls 4, 5, 6, 7. A door 8 is arranged in the front wall 6, such that a circuit breaker 9 can be racked out of the housing 1.

The back side wall 5 is provided with access openings, which are covered by shutter plates 10, 11. These shutter plates 10, 11 are operated by an operating mechanism comprising at least some rods 12 and a lever 13.

At the back of the housing 1 high voltage connectors 14, 15 are positioned, which are accessible once the shutter plates 10, 11 are moved up and the access openings are exposed. This allows for the circuit breaker 9 to connect with the high voltage connectors 14, 15.

A latch 16 is provided to keep the shutter plate 10 in the open position, when maintenance is to be performed.

Figure 2:
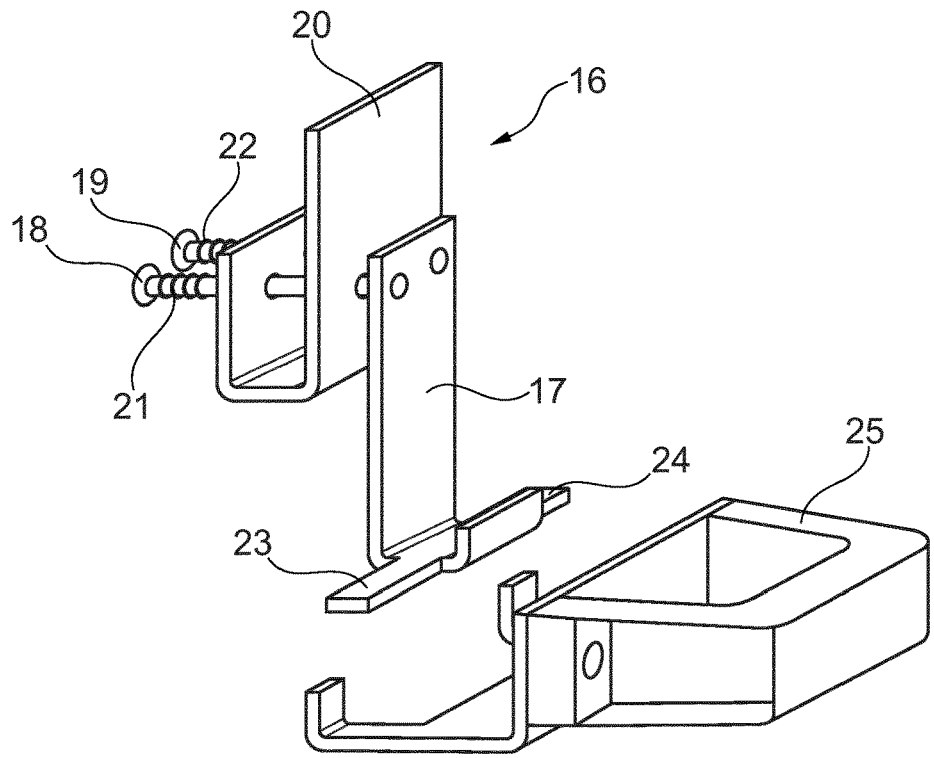
FIG. 2 shows a perspective view of the latch and a tool for operating the latch according to the invention.

FIG. 2 shows the latch 16 in more detail. The latch 16 has a hook-shaped element 17 with a J-shaped cross-section. The top of the J-shaped cross-section is arranged to two rods 18, 19, which are guided in a bracket 20. Springs 21, 22 are arranged around the rods 18, 19 to urge the hook-shaped element 17 against the bracket 20.

The J-shaped element 17 has on both side a protrusion 23, 24 which allows for a tool 25 to grip around the protrusions enabling a maintenance person to pull the latch 17.

Figure 3A:
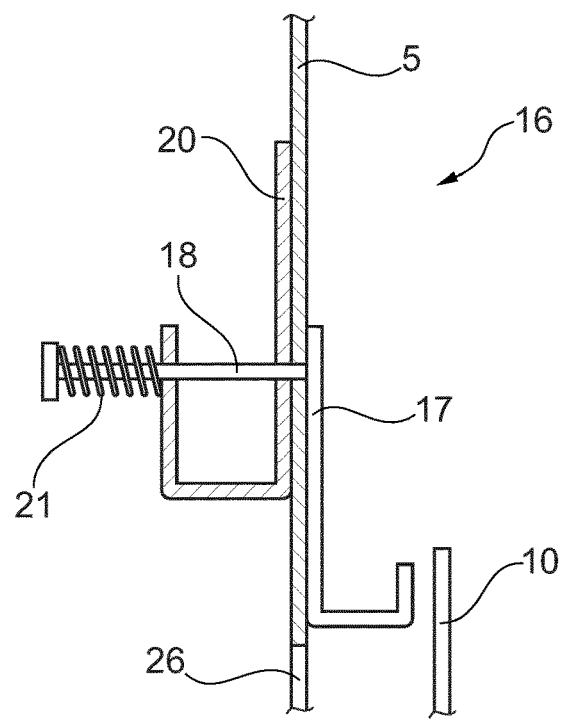
FIGS. 3A-3C show a cross sectional view of the embodiment of FIG. 1 in three different positions.

FIG. 3A shows the latch 16 in an unlatched position. The bracket 20 is attached to the back wall 5 just above an access opening 26. This access opening 26 is covered by a shutter plate 10.

Figure 3B:
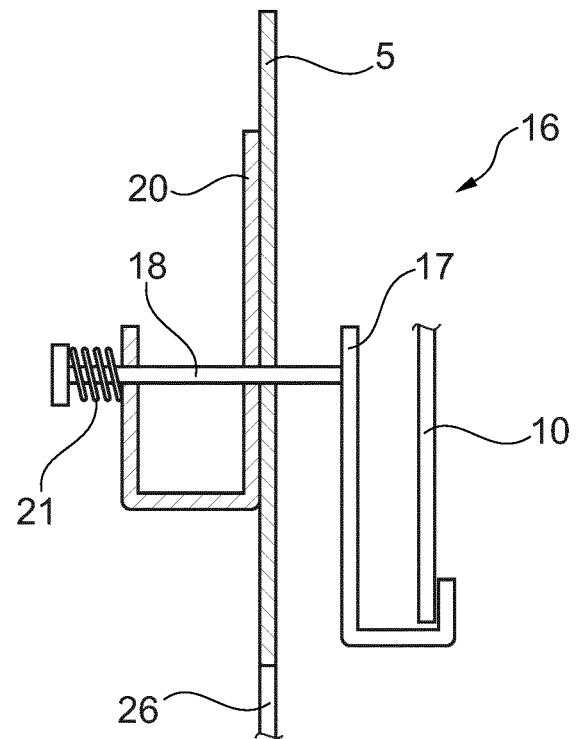

FIG. 3B shows the latch 16 in latched position. The shutter plate 10 is pulled to the open position and the latch 16 is pulled to the latched position, for example with the tool 25. Due to the J-shaped cross-section of the element 17, the shutter plate 10 is kept in open position and the latch 16 is prevented from returning to the unlatched position.

Figure 3C:
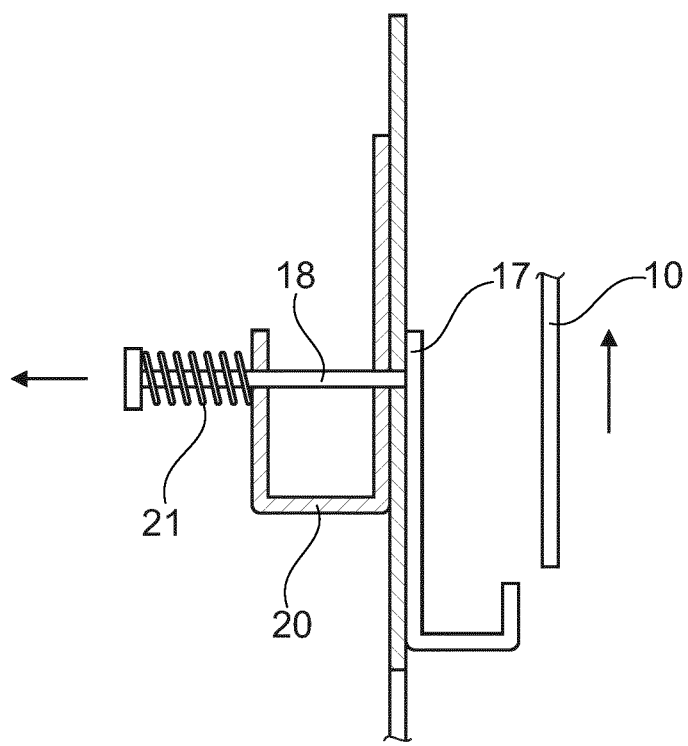

FIG. 3C shows the position, wherein the shutter plate 10 is moved to the full open position by the operating mechanism actuated by the circuit breaker 9. As a result, the shutter plate 10 is pulled out of the J-shaped element 17, which allows for the spring 21 to pull back the element 17 out of the path of the shutter plate 10 and resuming normal operation of the shutter plate 10.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A switchgear housing for housing an object, the switchgear housing comprising:
   a wall with an access opening;
   at least one shutter plate movable parallel to the wall between a closed position, in which the at least one shutter plate covers the access opening and an open position, in which the at least one shutter plate exposes the access opening;
   an urging means configured to urge the at least one shutter plate towards the closed position;
   an operating mechanism configured to operate the at least one shutter plate from the closed position to the open position when the object is moved into the switchgear housing; and
   at least one latch movable only in a direction perpendicular to the wall with the access opening and between a latched position and an unlatched position,
   wherein a path of the at least one latch and a path of the at least one shutter plate intersect, such that the at least one latch, in the latched position, blocks movement of the at least one shutter plate from the open position to the closed position.

2. The switchgear housing according to claim 1, wherein the at least one latch comprises a hook-shaped element guided along a guide and a spring means configured to urge the hook-shaped element towards the unlatched position.

3. The switchgear housing according to claim 2, wherein the hook-shaped element has a J-shaped cross-section,
   wherein a top of the J-shaped cross-section is arranged to the guide, and
   wherein a bottom part of the J-shaped cross-section grabs around the at least one shutter plate in latched position.

4. The switchgear housing according to claim 2, wherein the hook-shaped element comprises at least one protrusion, extending parallel to and spaced apart from the wall with the access opening both in the latched and unlatched position.

5. The switchgear housing according to claim 1, wherein the at least one latch is configured to block movement of the at least one shutter plate in an intermediate position of the at least one shutter plate between the closed position and the open position, the intermediate position being such that when the at least one shutter plate is moved further toward the open position, the at least one latch is automatically returned to its unlatched position.

6. The switchgear housing according to claim 1, wherein the switchgear housing comprises a bottom wall, side walls arranged along sides of the bottom wall, and a top wall arranged on a top of the side walls,
   wherein one of the side walls is the wall with the access opening, and
   wherein another one of the side walls comprises a removable wall for access to the object being moved into the switchgear housing.

7. The switchgear housing according to claim 6, wherein the wall with the access opening is arranged opposite the removable wall.

8. The switchgear housing according to claim 6, wherein the removable wall comprises a door.

9. The switchgear housing according to claim 1, wherein the object is a circuit breaker.

10. The switchgear housing according to claim 1, wherein the access opening is configured for access to an electrical connector.

* * * * *